(12) United States Patent
Nyhavn et al.

(10) Patent No.: US 12,152,485 B2
(45) Date of Patent: Nov. 26, 2024

(54) SYSTEM AND METHOD FOR DOWNHOLE MONITORING OF FLUID FLOW

(71) Applicant: Wellstarter AS, Trondheim (NO)

(72) Inventors: Fridtjof Nyhavn, Trondheim (NO); Terje Moen, Trondheim (NO)

(73) Assignee: Wellstarter AS, Trondheim (NO)

(*) Notice: Subject to any disclaimer, the term of this patent is extended or adjusted under 35 U.S.C. 154(b) by 518 days.

(21) Appl. No.: 17/310,500

(22) PCT Filed: Feb. 11, 2020

(86) PCT No.: PCT/NO2020/050033
§ 371 (c)(1),
(2) Date: Aug. 6, 2021

(87) PCT Pub. No.: WO2020/167135
PCT Pub. Date: Aug. 20, 2020

(65) Prior Publication Data
US 2022/0098974 A1 Mar. 31, 2022

(30) Foreign Application Priority Data
Feb. 12, 2019 (NO) .................................. 20190198

(51) Int. Cl.
*E21B 47/11* (2012.01)
*E21B 36/00* (2006.01)
(Continued)

(52) U.S. Cl.
CPC ............ *E21B 47/11* (2020.05); *E21B 36/008* (2013.01); *E21B 47/06* (2013.01); *E21B 47/14* (2013.01);
(Continued)

(58) Field of Classification Search
CPC ........ E21B 47/11; E21B 36/008; E21B 47/06; E21B 47/14; E21B 36/005; G01N 29/024; G01N 29/14; G01N 2291/02836
See application file for complete search history.

(56) References Cited

U.S. PATENT DOCUMENTS 6,227,293 B1 * 5/2001 Huffman ............... E21B 43/003
166/177.2
6,272,916 B1 * 8/2001 Taniguchi ............... E21B 47/16
73/152.32
(Continued)

FOREIGN PATENT DOCUMENTS

RU    111185 U1    12/2011
RU    2582604 C1    4/2016
(Continued)

OTHER PUBLICATIONS

International Search Report dated May 20, 2020, for International patent application No. PCT/NO2020/050033, filed on Feb. 11, 2020.
(Continued)

*Primary Examiner* — Nicole Coy
(74) *Attorney, Agent, or Firm* — K&L Gates LLP

(57) ABSTRACT

A system and method for monitoring fluid flow in a downhole reservoir, characterized by at least one energy source (1), which simultaneously sends two or more utility pulses. The pulse can be a fast propagating and flow-independent acoustic pulse, a somewhat slower propagating and flow-dependent pressure pulse, a slow propagating heat pulse or a slow-propagating tracer pulse. The energy sources are connected via said pulses, without cable, and at least an upper heat source (1') is connected to equipment on the surface via a cable (4).

16 Claims, 3 Drawing Sheets

(51) Int. Cl.
*E21B 47/06* (2012.01)
*E21B 47/14* (2006.01)
*G01N 29/024* (2006.01)
*G01N 29/14* (2006.01)

(52) U.S. Cl.
CPC ............ *G01N 29/024* (2013.01); *G01N 29/14* (2013.01); *G01N 2291/02836* (2013.01)

(56) References Cited

U.S. PATENT DOCUMENTS

| | | | |
|---|---|---|---|
| 6,400,646 | B1 | 6/2002 | Shah et al. |
| 7,434,630 | B2 * | 10/2008 | Shah ..................... E21B 47/16 175/423 |
| 8,839,871 | B2 * | 9/2014 | Wright ................. E21B 49/081 166/383 |
| 10,077,635 | B2 * | 9/2018 | Xu ......................... E21B 37/00 |
| 10,273,792 | B2 * | 4/2019 | Mace .................... E21B 43/263 |
| 11,359,484 | B2 * | 6/2022 | Patterson ............ E21B 47/0224 |
| 2007/0061093 | A1 | 3/2007 | Angelescu et al. |
| 2007/0234788 | A1 | 10/2007 | Glasbergen et al. |
| 2010/0147349 | A1 | 6/2010 | Difoggio |
| 2011/0011576 | A1 | 1/2011 | Cavender et al. |
| 2011/0088462 | A1 | 4/2011 | Samson et al. |
| 2011/0122727 | A1 * | 5/2011 | Gleitman ................ E21B 47/14 367/81 |
| 2015/0075783 | A1 | 3/2015 | Angman et al. |
| 2018/0245453 | A1 * | 8/2018 | Aasheim ............... E21B 47/113 |

FOREIGN PATENT DOCUMENTS

| | | | |
|---|---|---|---|
| RU | 2599653 C1 | 10/2016 | |
| RU | 2671879 C2 | 11/2018 | |
| WO | WO-2017131530 A1 * | 8/2017 | ........... E21B 36/001 |
| WO | 2017203296 A1 | 11/2017 | |

OTHER PUBLICATIONS

NO Search Report, dated Sep. 11, 2019 for NO U.S. Appl. No. 20/190,198, filed Feb. 12, 2019, 2 pages.

* cited by examiner

SYSTEM AND METHOD FOR DOWNHOLE MONITORING OF FLUID FLOW

FIELD OF THE INVENTION

The invention relates to downhole monitoring of fluid flows, particularly in oil and gas reservoirs.

BACKGROUND OF THE INVENTION

As the oil and gas industry is challenged in terms of increasingly complex oil and gas reservoirs, the need for downhole reservoir monitoring will increase. The wells are long and often penetrate different reservoirs or reservoir zones with different features. We have come to the point at which unmonitored drainage often does not lead to profitable production. Traditionally, the answer to "what flows where and how much" in the wells is sought. In addition, there is also a need for tools for diagnosing production problems, such as leakage, cross flows or blocked zones. Data from production monitoring can be used for maximizing well utilization in the short term, but are also decisive for optimization of the degree of extraction over the life of the field.

Campaign-based production logging tools (Production Logging Tool; PLT) on cables or coiled tubing have been the most commonly used monitoring technology. However, PLT-based monitoring usually involves high costs and operational risk and may even not be technically feasible. This particularly applies to wells with well heads on the sea bed. Therefore, operators have a tendency to cut down on the use of PLT and instead base production on guessing, which often does not reflect the actual well conditions. As a result, the oil extraction potential is poorly explored, which drives the need for drilling more wells. For instance, the extraction degree for dry well heads (easy to go into the well with monitoring and control initiatives) is 20-30% higher than for more inaccessible wells (e.g. subsea and in deep water). Permanent cable-based monitoring is an alternative to PLT. Optical fibres provide good performance if they are successfully installed and in a well with the right features. DTS (Distributed Temperature Sensing) and DAS (Distributed Acoustic Sensing) are techniques that are based on fibres, and which offer useful information. However, high costs and reliability challenges have impeded widespread use.

Due to the above-mentioned cost and reliability challenges of cabled-based downhole monitoring, the industry has in recent years shown increased interest in cable-less (wireless) systems. A technique, which has won increasing acceptance is "Intelligent/Smart" permanently installed chemical tracers. Tracing of downhole incidents and flow paths has opened up for a new type of downhole monitoring and a large market potential has emerged. Tracer-based monitoring systems are not chosen as much for the quantification of rates, but rather because tracers make it possible to obtain qualitative indications at a minimal installation and production risk and at attractive costs. The main challenges of permanent downhole tracers is that the wells will have to be closed and started to create the concentration transients that turn out to be necessary to offer good quantitative indications. The result is that the information does not reflect stable production conditions. This is of crucial importance, particularly for multiphase flow with a high gas content. For the sake of comparison, it can be mentioned that the procedure of PLT is always to try to run production at steady-state condition before the monitoring can be trusted (it is still subject to considerable uncertainty). As regards tracers, there are also challenges in connection with the distance between the reservoirs and the sampling point, operational challenges with liquid sampling and transportation logistics to the analytical laboratory. Our conclusion is that tracer-based monitoring systems have turned out to have a certain legitimacy, but that there is a need for a complementary technology, which can operate during steady-state production.

The prior art comprises WO 2017/131530 A1, which describes a new technology called HIPlog (HIP=Heatwave Inflow Profiling), wherein heat pulses are used instead of or complementarily to physical tracers to trace downhole incidents, flow paths and rate estimation.

SUMMARY OF THE INVENTION

The invention is disclosed and characterized by the independent claims, whilst the dependent claims describe other characteristics of the invention.

This provides a system for monitoring fluid flows in a downhole reservoir, characterized by at least one heat source arranged in a downhole completion and configured to—by exothermic reactions—generate acoustic pulses that propagate along a tubular in the downhole completion, wherein the heat source is arranged such as to obtain a gap between the heat source and the tubular wall.

In one embodiment, the heat source is configured to generate an acoustic pulse comprising an acoustic pulse from an exothermic reaction inside the heat source and a subsequent acoustic pulse generated by boiling fluids in the vicinity of the outer surface of the heat source.

In one embodiment, the heat source further is configured to generate a fast propagating and flow-independent acoustic pulse, a somewhat slower propagating and flow-dependent pressure pulse, a slow propagating heat pulse.

In one embodiment, the heat source further is configured to generate a tracer pulse.

The heat sources are connected via said pulses, without cable. In one embodiment, at least an upper heat source is connected to equipment on the surface via a cable.

A downhole sensor can be provided to receive at least one of the pulses. The sensor may be a PDG. An energy source can be arranged above the sensor to generate an acoustic pulse that propagates downwards in lower completion.

In one embodiment, the heat source comprises means for generating an asymmetrical exothermic reaction that starts at one end and propagates to the other end of the heat source. The means may be configured to modulate the exothermic reaction by various delay sections and different reactants along the heat source.

A method for downhole monitoring of fluid flow has also been provided, characterized in that it uses at least one heat source according to the invention, positioned in a downhole well completion and simultaneously generates and sends two or more utility pulses for communication with one or more downhole energy sources or sensors. Said pulses can be used for activating (triggering) one or more downhole heat sources.

Said generated pulse can be a fast propagating and flow-independent acoustic pulse, a somewhat slower propagating and flow-dependent pressure pulse, a slow propagating heat pulse or a slow-propagating tracer pulse.

So the invention relates to a system of acoustic signalling on downhole tubulars. The system according to the invention enables cable-less signalling from the surface to the heat sources, which enable monitoring «On Demand», meaning a triggering of the heat sources on demand from the surface at a desired time. Moreover, the system facilitates synchronization of time (clocks) on the surface and downhole to be kept within a few seconds during a period of more than a year. This will offer optimum data quality from the interpretation algorithms. Though cable-less systems already exist today, which can technically solve the signalling needs, these are not based on heat sources that emit acoustic energy. The system according to the invention facilitates a widening of the use of flow tracing with non-material heatwave techniques.

The invention facilitates utilization of velocity of propagation of two or more utility pulses for characterizing the inflow from different zones in the well.

The heat units/sources can be configured so that heat is transmitted into an annulus or into the production tubing or a combination of the two.

The system enables the use of an acoustic pulse (e.g. in the production tubing) for synchronizing clocks in downhole units (e.g. the heat units) as well as—if so desired—also synchronizing one or more downhole units with clocks on the surface.

SHORT DESCRIPTION OF DRAWINGS

The aforementioned and other characteristics of the invention will be further explained in the following description of a preferred embodiment, presented as a non-limiting example and with reference to the accompanying drawings, wherein:

FIG. 5a illustrates an acoustic pulse in a solid (e.g. steel) wall, FIG. 5b illustrates a pressure pulse in well fluids, FIG. 5c illustrates a heat wave in well fluids, and FIG. 5d illustrates a tracer concentration wave (pulse) in well fluids;

DETAILED DESCRIPTION OF A PREFERRED EMBODIMENT

Figure 1:
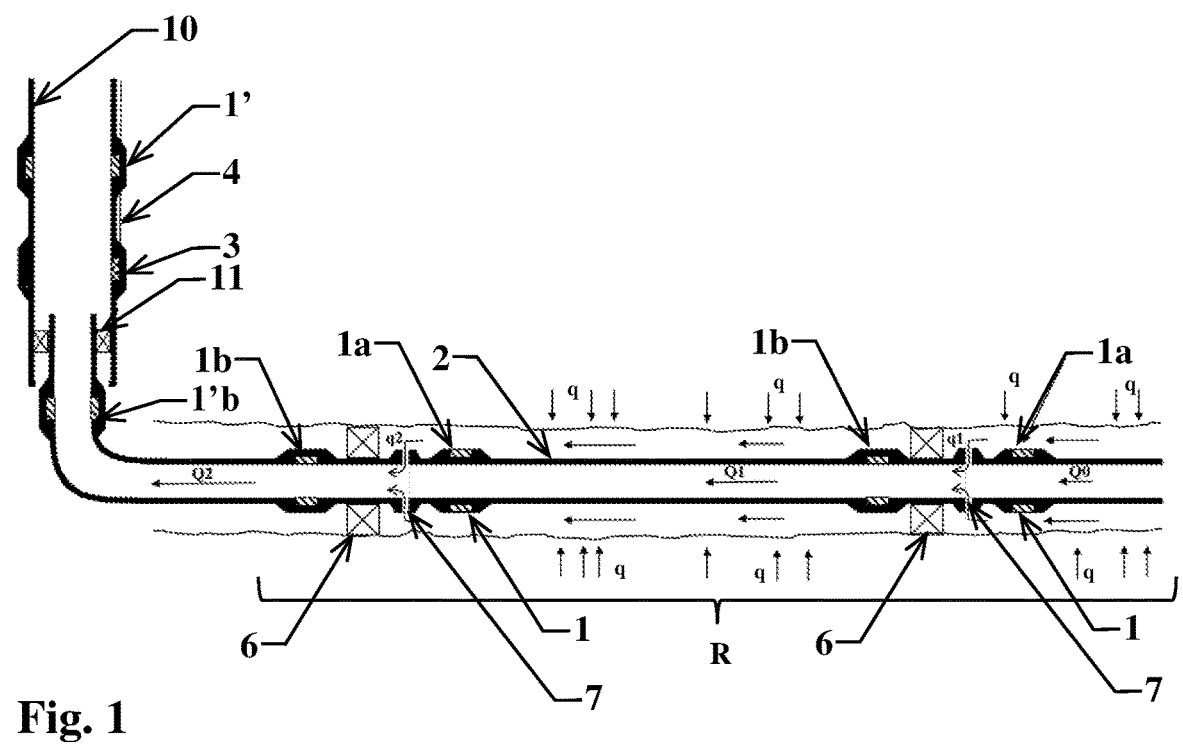
FIG. 1 is a schematic diagram, showing the system according to the invention installed in a downhole completion.

The following description may use expressions as "horizontal", "vertical", "lateral", "back and forth", "up and down", "upper", "lower", "inner", "outer", "forward", "rear", etc. These expressions essentially refer to the perspectives and locations showed in the drawings and related to a normal use of the invention. The expressions are used only to facilitate the comprehension of the description and should not be limiting.

The selected heat source concept is based on exothermic reactions with reactants, which in the form of heat units (comprising heat sources) for instance are carried in heat tubes (pulsed heat source) 1, which are attached onto a downhole completion (e.g. a production tubing) 2 in a reservoir zone R, as shown in FIG. 1. The heat units 1 can for instance be of a first configuration 1a, arranged to heat up fluids on the outside of the production tubing 2 ("outward vented") or of a second configuration 1b to heat up fluids inside the production tubing ("inward vented"). For the purpose of this description, it shall be understood that a heat unit 1 comprises at least one heat source (for example an exothermic heat tube) and other ancillary parts and components as are described below. In certain contexts, the terms heat unit and heat source may therefore be regarded as synonyms. Unless otherwise noted, the heat units 1a, 1b are identical and may collectively be designated as heat units 1.

FIG. 1 illustrates how a plurality of heat units 1 are arranged at various positions along the production tubing 2. The production tubing is connected to a casing 10 and a corresponding liner hanger packer 11. Packers 6 define separate inflow zones, and wellfluids q flow from the formation surrounding the production tubing and in the respective inflow zones as wellflows q1 and q2, through designated inflow ports 7 and into the production tubing 2.

Positioning of inward and outward vented heat units 1 will typically be where there is considerable volume flow past the different units, so that it will be possible to detect a heat pulse (at downstream sensors). However, longitudinal positioning along the completion may also be based on other considerations, such as calculated times for when the various signals are to reach the relevant sensors. Furthermore, one could imagine that heat units 1 are positioned so that they are not to send signals during expected production, while they should emit a signal in case of unusual conditions. This could for instance be from a partial zone, where no production is expected.

When the heat sources in the heat units 1a, 1b are activated, heat pulses are imposed on the fluids that flow past theses heat units 1a, 1b, and these heat pulses are later registered on a downstream temperature meter, for example a PDG (PDG=Permanent Downhole Gauge) 3. In the embodiment illustrated in FIG. 1, the PDG 3 is connected to registration and control equipment (not shown) on the surface, via a cable 4. An optional heat pulse source 1', connected by cable to the surface, is also shown in FIG. 1. The purpose of this arrangement is to be able to transmit from the upper completion (using the cable 4), to the lower completion (without the cable, but using the heat sourced according to the invention).

The registered temperature pulses then form the basis for model-based interpretation, wherein it is attempted to calculate back to the flow q across the reservoir zone R, the zone flow contributions q1, q2 and the production tubing 2 flow Q0, Q1, Q2. Reference is also made to prior art, such as WO 2017/131530 A1 mentioned above for further details. The above mentioned WO 2017/131530 A1 also describes several other downhole completion configurations. A first system will be based on pre-programmed time control of the times of the heat pulses.

In general, a heat unit 1 comprises a heat source, an electronic control unit which activates an electric igniter, which in turn activates an exothermic reaction in the heat source (e.g. heat tube). The heat unit may thus be a programmable heater module, and correspondingly be termed as a PROHM (PROgrammable Heater Module).

However, there is a clear recommendation from the industry that the heat pulses and thereby the monitoring should preferably be triggered by a command from the surface ("On Demand"), at a time desired by the operator. In addition, there is a requirement for the synchronization of time (clocks) on the surface and downhole. The global accuracy of time should be within a few seconds in the course of one year. This cannot be obtained with known clock technology, and regular synchronization is therefore required. This is to obtain optimum data quality from the interpretation algorithms. Due to experience with acoustic energy, which can be excited from heat sources and registered along the production tubing 2, a development of signalling based on this energy has been evaluated as part of the invention. Signalling on the production tubing is also interesting as a partial system for an "On Demand" solution according to the invention.

The electronic control unit (not shown) in the heat unit is based on a microcontroller with extremely low power consumption, which can at the same time control and monitor various functions. The heat unit may also be provided with for example sensors that may measure e.g. pressure, temperature, movement (accelerometers) and sound (hydrophone). Furthermore, the exothermic heat source in the heat unit can be combined with mechanical devices, which per se are known in the art, to create sound pulses by for instance releasing a tightened spring, which can thereby generate both a sound pulse and a mechanical pulse that propagate through the tubing. Such pulses can also be generated by a form of faster reaction or detonation being released, creating a stronger pulse, in connection with the exothermic reaction. The individual heat unit 1 is thereby enabled to both send signals to other heat units 1 and to receive signals from other heat units or from the surface. Thus, among other things, clocks can be synchronized or clocks can be started so that the desired trigger time is obtained.

The heat pulse that is generated will affect the fluid flowing from the well. Firstly, heating of a given fluid volume will take place. This fluid volume will create a heat pulse that can be detected by a downhole pressure and temperature meter. This heat pulse will also be detectable by the electronic control unit in other heat units 1 and can be used as trigger signal for these. Another feature of the heat pulse is that a volume change in produced fluid may take place. Produced oil on reservoir conditions is often close to the bubble point, so that even a limited amount of added energy can lead to gas formation, which leads to a change in the volume flow. In a similar case, it is imaginable that change in the volume flow can be perceived as a pressure pulse on a downhole pressure sensor or in the well head or other places, where suitable sensors are arranged, possibly both pressure and change in volume flow can be registered.

Systems for cable-less signal transmission based on both pulsing through fluid and through tubing is known. An important part of such a system is a pulse generation system. In this case, the exothermic reaction provides opportunities both directly as shown in experiments and through further refining of the process. Another phenomenon is that the increased temperature as caused by an exothermic reaction can be used for increasing the release of a chemical tracer. This is possibly a tracer pulse which is released without it being necessary to change the production rate, which is normally the case when using a chemical tracer only.

If the signalling down to relevant heater units in the well takes place by pulsing through fluid, it may be relevant to do this in case of a very low signal rate, which in practice will involve stopping and starting the production for many seconds and possibly minutes. Such pulsing will be a change in the natural well flow and may disturb an otherwise stable inflow picture from the reservoir. It may therefore be sensible that the heat units are activated for some time (hours or days) after the trigger signal has been sent.

Figure 2:
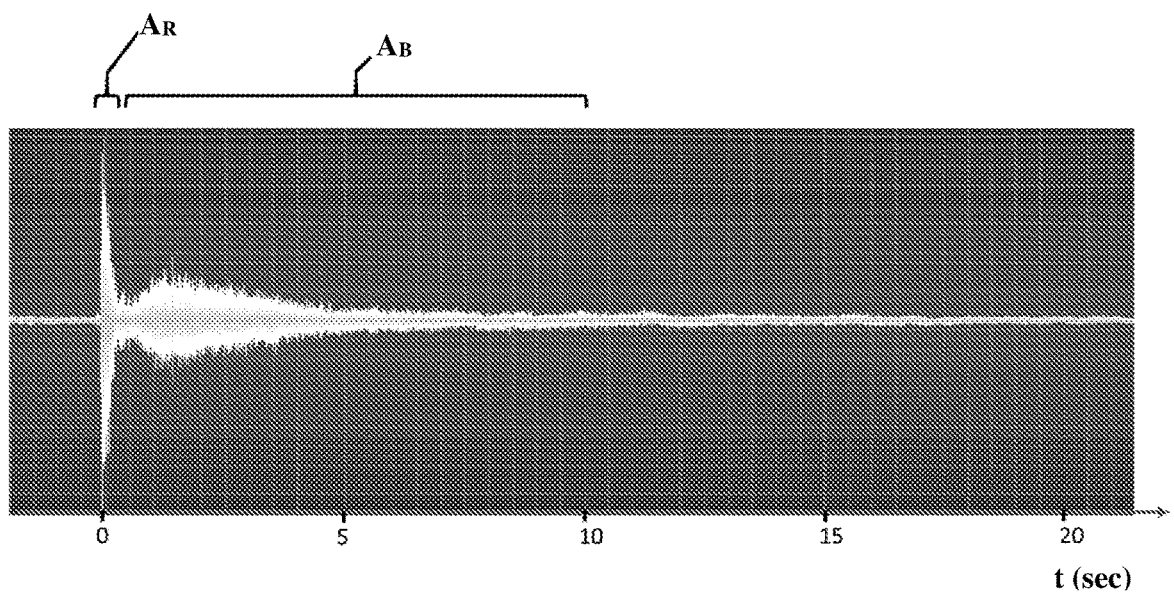
FIG. 2 is a time plot of an acoustic pulse generated by a heat source and shows a relatively short pulse from the exothermic reaction itself, with a subsequent boiling sound from the hot surface.
Figure 3:
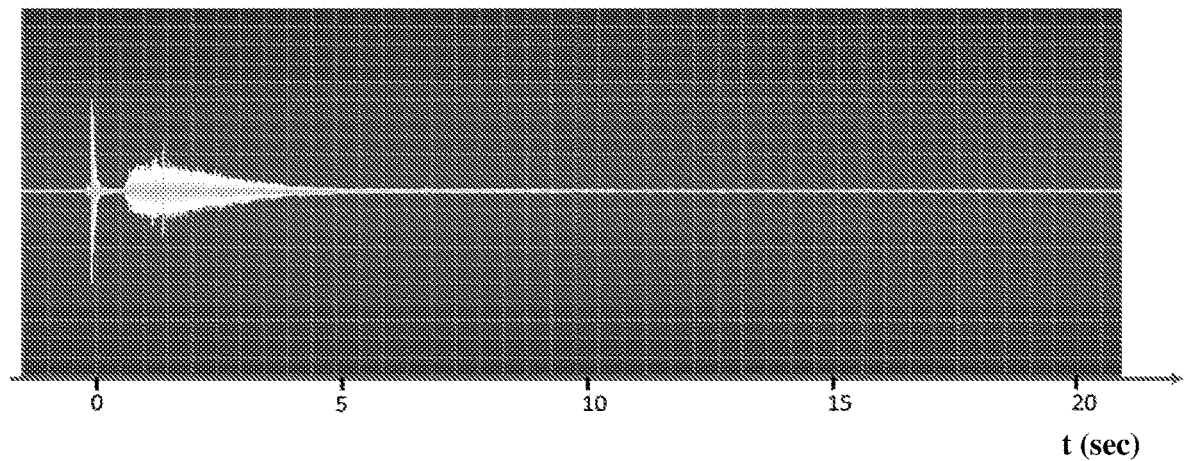
FIG. 3 is a time plot of the pulse of FIG. 2 after a high-pass filtering.
Figure 4:
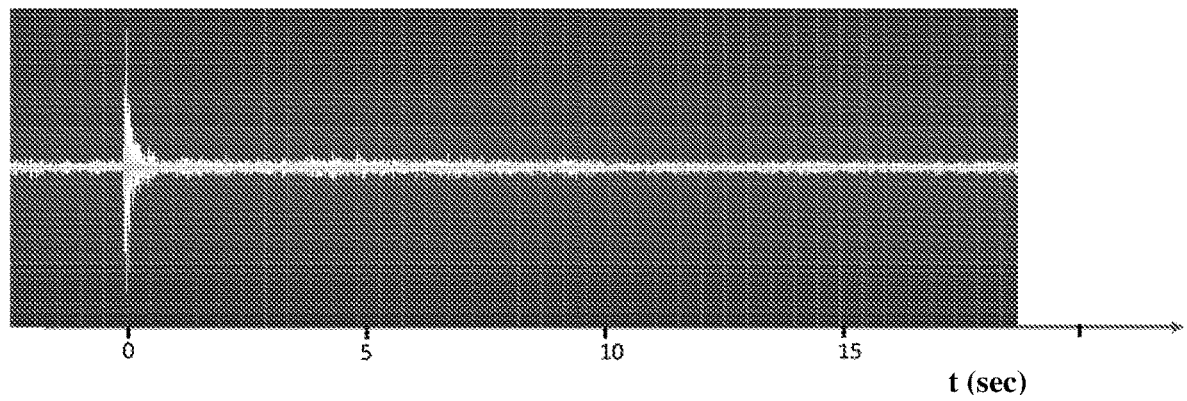
FIG. 4 is time a plot of the low-frequency part of the pulse in FIG. 2.

The fast-acting heat sources in the heat units 1a, 1b according to the invention will, in addition to heat, also release acoustic pulses, which will propagate along the tubing in connection with which the heat source is positioned (here: the heat tube 1a, 1b mounted on the production tubing 2). Such acoustic pulses were demonstrated on SINTEF's 200 meter, 4" flow loop, and an accelerometer recording (sensor for acoustic waves) 15 m from the heat source is shown in FIG. 2 (acceleration vs. time). We see that we receive a relatively short and immediate acoustic pulse $A_R$ from the exothermic reaction inside the heat source itself, with a subsequent boiling sound (acoustic pulse) $A_B$ from the boiling taking place in the fluids exposed to hot surface (the heat source). In theory, and as a non-limiting example, the heat source releases about 250 kilojoules of energy, and some of this energy thus comes in the form of an acoustic pulse. FIG. 3 shows the same pulse after a high-pass filtering at filter frequency of 10 kHz. We see that this high-frequency part of the pulse can still be captured with good signal/noise conditions even after 15 m and probably some hundreds of meters. This shows that both the pulse immediately from the exothermic reaction $A_R$ and the boiling sound $A_B$ may be used over some hundreds of meters before signal/noise ration gets too poor for practical use. FIG. 4 shows a band-passed filtered (50-200 Hz)) version of the received signal (FIG. 2). We see a strong pulse $A_R$, but now the boiling sound $A_B$ has disappeared. Low frequency signals will basically travel longer distances than higher frequencies, so $A_R$ is thus the part of the signal that can be used for signalling over longer ranges, probably over 1 km on this tubing. In this manner, acoustic pulses, generated by one heat source (1a and/or 1b) can be used for activating (triggering) other heat sources (1a and/or 1b) upstream or downstream of the heat source (heat unit; see FIG. 1).

The technological solution outlined to generate a heat pulse in combination with one or more of the other pulses may provide understanding of the inflow along the well path without installation of complicated accessory equipment such as cables or the like. The system may be passive and the individual heat units may be mounted on short tubing sections (e.g. pup joints with cross-over subs), which have minimal impact for the well flow during normal production. Although not illustrated, a shroud may be arranged in the pup joint in order to protect the heat unit during e.g. well intervention operations. Thus, the invention provides a new, simple and reliable system for monitoring well flow.

Figure 5:
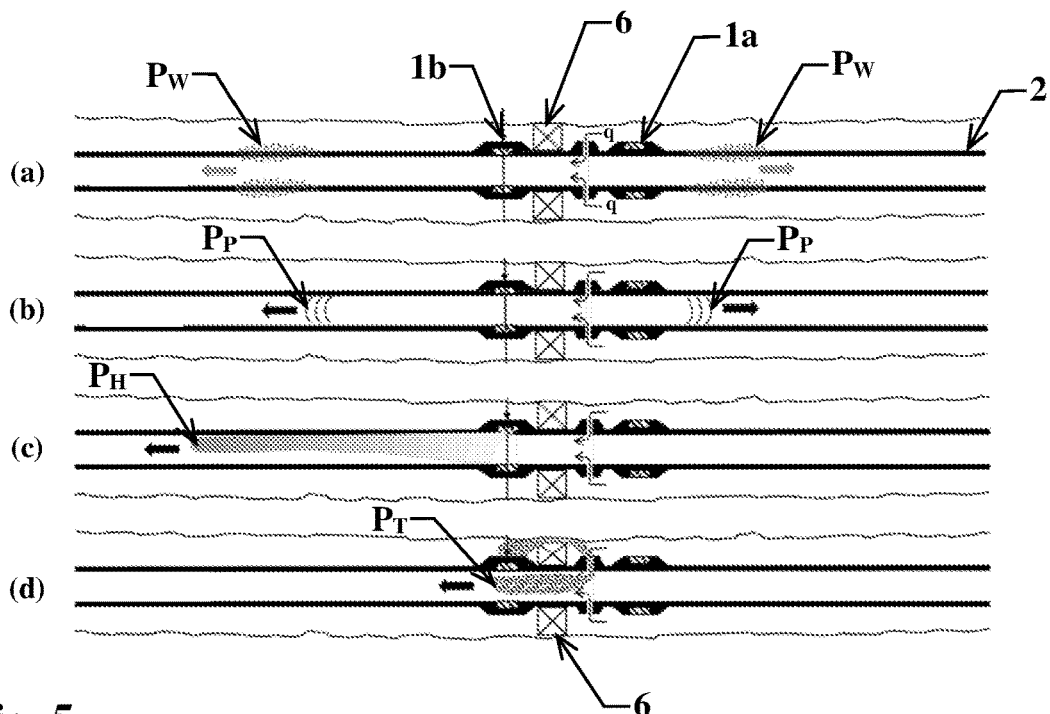
FIG. 5 is a section of a downhole completion, wherein a heat source simultaneously sends two or more utility pulses, where

FIG. 5 illustrates a section of a downhole completion (for example as section of the completion shown in FIG. 1), wherein an energy source (here: heat source/unit 1b) is activated to simultaneously sends two or more utility pulses. The utilization value of the various pulses is described in the figure and can be summarized as follows:

FIG. 5a—The utility pulse is an acoustic pulse in a solid (e.g. steel) wall:

A bi-directional, fast propagating and flow-independent acoustic pulse $P_W$ in the tubing 2 steel wall may reach the entire lower completion within a very short time (e.g. 1 second) after the heat source has been triggered. Propagation speed may exceed 3000 meters/second. The propagation is independent of the well fluids and may be used for clock synchronization and action triggering (on demand).

FIG. 5b—The utility pulse is a pressure pulse in well fluids:

A "medium fast" flow-dependent pressure pulse $P_P$, somewhat slower than the acoustic pulse is propagating in the well fluids and may reach the lower completion within 5 to 10 seconds after the heat source has been triggered. The pulse formation and propagation speed are uncertain and highly fluid dependent. This pulse may mainly be used for well diagnostics and fluid characterization.

FIG. 5c—The utility pulse is a heat pulse (wave) in well fluids:

A relatively slow-propagating heat pulse $P_H$ (wave) in the flowing well fluids will propagate only downstream, towards the lower completion. The generated heat wave is dependant of fluid composition and flow regime. This pulse is mainly used for well diagnostics and for estimating flow velocity and/or flow rate.

FIG. 5d—The utility pulse is a tracer concentration wave (pulse) in well fluids:

A slow-propagating tracer pulse $P_T$ (slug) will propagate downstream with the flow. This pulse has some similarities with the heat wave (FIG. 5c), but its flow physics is different. This pulse is mainly used as an indicator, e.g. for fluid leaks across packers. This figure illustrates how a leak across a packer 6 may be detected by releasing a tracer slug on one side of the packer 6, and detecting the tracer slug that has flowed past the packer and into the tubing, at a location downstream inside the tubing. It should be understood that although the figure shows an inward-vented heat source, a tracer slug may be released as illustrated also from an outward-facing heat source.

Though FIG. 5 only shows one heat source (1a and/or 1b), it is to be understood that the generated pulses can be used for activating (triggering) other heat sources upstream or downstream of the heat source. The various pulses connect (i.e. activate) the heat sources (the heat tube) only by the acoustic pulse itself, i.e. without cable, while the top heat source may have a cable to the surface.

Figure 6:
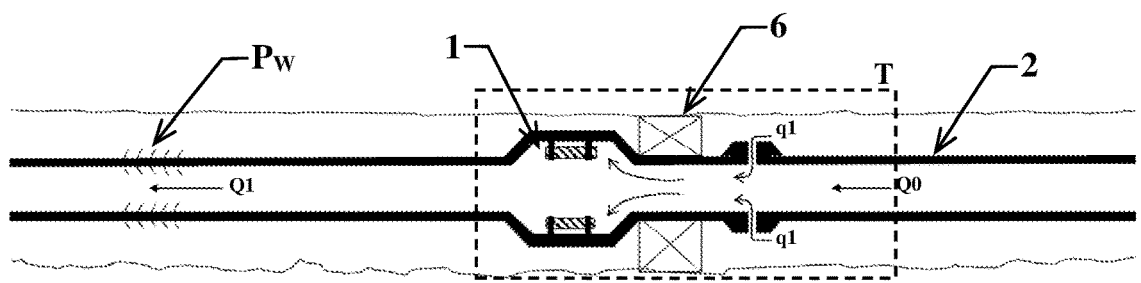
FIG. 6 is a schematic diagram of another embodiment of the invention, illustrating av inwardly vented heat source.
Figure 7:
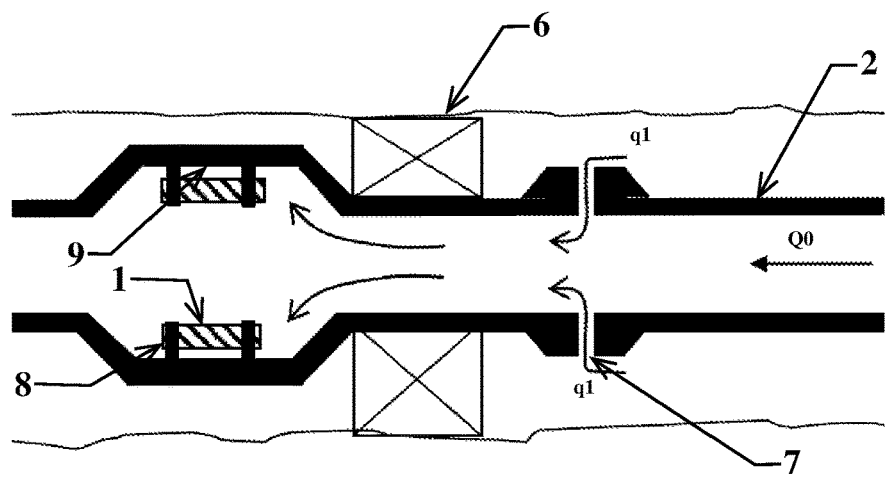
FIG. 7 is an enlarged view of the section "T" in FIG. 6.

FIGS. 6 and 7 illustrate another embodiment of the invention. Unless specifically noted otherwise, the features and functions of this embodiment shall be similar to those described above with reference to FIGS. 1 to 5.

In this embodiment, the heat unit (comprising the heat source) 1 is arranged inside the production tubing and fixed to the tubing wall by one or more brackets 8 in order to obtain a gap 9 between the heat unit and the tubing wall. The brackets 8 are formed of a thermal-insulating material, and the gap 9 ensures that the heat unit is thermally decoupled from the tubing wall. The heat tube is preferably arranged in a region of enlarged production tubing diameter (e.g. a pup joint, as described above), as illustrated in the figures. Although FIGS. 6 and 7 illustrate an inward-vented heat unit, it should be understood that this arrangement may also be outward vented.

When the heat source is activated, the primary effect will the generation of an energy flow in the form as heat from the source and into surrounding fluids Q0, Q1 (cf. heat pulse $P_H$, see FIG. 5c). Secondary effects (but more immediate in time than the heat pulse) will create one or more acoustic pulses that propagate are transmitted to the tubing wall and propagate along the tubing wall (cf. acoustic pulse $P_W$, see FIG. 5a). Several mechanisms contribute to the creation of the broadband acoustic pulses described above. Originating in the heat unit 1, they propagate through one or more of the mechanical brackets 8 and further into and along the completion tubing 2. The completion tubing wall receives only minor heating, so the formation of the acoustic pulses is solely in or at the thermally decoupled heat source 1.

The acoustic pulse (or pulses)—which may travel long distances (e.g. several kilometres) in completion tubing—may be generated by one or more of the following phenomena:

Overall heating of heat source wall from internal heat generation.

Fast mass flow of melted metals inside the heat source, e.g. along the length of the heat source.

Transient metal gas formation inside the heat source.

Boiling fluids at the outer surface of the heat source. This acoustic pulse will be of a higher frequency than the above-mentioned pulses, and may thus travel shorter distances (e.g. some hundreds of meters).

The heat generation inside the heat source may be based on an asymmetrical exothermic reaction that starts at one end and propagates to the other end of the heat source (e.g. a heat tube).

The exothermic reaction may be modulated by inserting delay sections and different reactants along the heat source tubing. This will then also modulate the acoustic pulses accordingly and such that unique signatures may be transmitted.

By using pulses based on different physical principles, such as a heat pulse in combination with one or more pulses (utility pulses), such as sound in tubing, pressure pulse in fluid and chemical pulse in fluid, it can be possible to carry out detailed interpretation of the well flow. For instance, it is interesting to measure the time delay between various pulse types, as they will all have different characteristic velocities of propagation.

An example of an exothermic heat source/unit is copper thermite, but the invention shall not be limited to this material.

Although the invention has been described with reference to a production tubing 2, the invention shall not be limited to this application, but is applicable for fluid flow in any tubular.

The invention claimed is:

1. A system for monitoring of fluid flow in a downhole reservoir zone (R), said system comprising a downhole completion comprising a tubular (2) arranged in the reservoir zone (R), and comprising:
   heat sources (1, 1a, b) attached to the tubular (2) and each configured to, by exothermic reactions, generate acoustic pulses that propagate in a solid wall of the tubular (2) in the downhole completion, wherein each heat source is of a first configuration (1a) arranged to heat up fluids on the outside of the tubular (2) or of a second configuration (1b) to heat up fluids inside the tubular (2), and wherein the heat sources are connected via said acoustic pulses, without cable, and further comprising at least one upper heat source (1') arranged on an upper completion and connected to equipment on the surface via a cable (4); and
   a downhole sensor which is arranged to receive at least one of the acoustic pulses.

2. A system according to claim 1, said acoustic pulses comprising an acoustic pulse generated from an exothermic reaction inside the heat sources and a subsequent acoustic pulse generated by an outer surface of the heat sources being in contact with surrounding fluid.

3. A system according to claim 1, wherein at least one of the acoustic pulses comprises a boiling sound.

4. A system according to claim 1, wherein the heat sources are further configured to simultaneously generate at least one of a flow-dependent pressure pulse, a heat pulse, or a tracer pulse.

5. A system according to claim 1, wherein the sensor is a sensor for acoustic waves.

6. A system according to claim 1, wherein one of the heat sources is an upper heat source (1') arranged above the sensor to generate an acoustic pulse that propagates downwards in a lower completion.

7. A system according to claim 1, wherein the heat sources comprise copper thermite.

8. A system according to claim 1, wherein the downhole completion comprises a production tubing (2).

9. A system according to claim 1, wherein the heat sources are each operable to generate an asymmetrical exothermic reaction that starts at one end and propagates to a second end of each heat source.

10. A system according to claim 9, wherein the exothermic reaction is modulated by various delay sections and different reactants along each heat source.

11. A method of downhole monitoring of fluid flow using the system of claim 1 comprising simultaneously generating and sending two or more of said acoustic pulses for communication with other downhole heat sources or sensors.

12. A method according to claim 11, wherein said acoustic pulses are used for activating one or more other downhole heat sources.

13. A method according to claim 11, wherein at least one acoustic pulse is used for at least one of synchronizing one or more clocks in one or more heat sources or synchronizing one or more heat sources with clocks on the surface.

14. A system according claim 1, wherein at least one heat source is fixed to the tubular wall by one or more brackets (8) in order to obtain a gap (9) between the heat source and the tubular wall.

15. A system according to claim 14, wherein the brackets (8) are formed of a thermal-insulating material, and the gap (9) ensures that the heat source is thermally decoupled from the tubular wall.

16. A system according to claim 14 or claim 15, wherein said acoustic pulses are transmitted to the tubular wall and propagate along the tubular wall, and wherein the acoustic pulses propagate through one or more of the brackets (8) and further into and along the tubular (2).

* * * * *